United States Patent
Botadra et al.

(10) Patent No.: US 11,588,183 B2
(45) Date of Patent: Feb. 21, 2023

(54) WOUND ELECTRODE ASSEMBLY FOR AN ELECTROCHEMICAL CELL, AND METHODS AND DEVICES FOR MANUFACTURE OF SAME

(71) Applicants: Robert Bosch Battery Systems LLC, Orion, MI (US); Robert Bosch GmbH, Stuttgart (DE)

(72) Inventors: Mehul Botadra, Sterling Heights, MI (US); Eugene Levin, Rochester Hills, MI (US); Mark Kotik, Rochester Hills, MI (US); Paul Frick, Wixom, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 1098 days.

(21) Appl. No.: 16/228,524

(22) Filed: Dec. 20, 2018

(65) Prior Publication Data
US 2019/0123392 A1   Apr. 25, 2019

Related U.S. Application Data

(62) Division of application No. 15/082,743, filed on Mar. 28, 2016, now Pat. No. 10,224,573.

(51) Int. Cl.
*H01M 10/0587* (2010.01)
*H01M 10/052* (2010.01)
(Continued)

(52) U.S. Cl.
CPC ..... *H01M 10/0587* (2013.01); *H01M 10/049* (2013.01); *H01M 10/0409* (2013.01);
(Continued)

(58) Field of Classification Search
None
See application file for complete search history.

(56) References Cited

U.S. PATENT DOCUMENTS

| 5,116,043 A | 5/1992 | Jermann et al. |
| 6,027,831 A | 2/2000 | Inoue et al. |
| (Continued) | | |

FOREIGN PATENT DOCUMENTS

| JP | 08-153519 | 6/1996 |
| JP | 11-297347 | 10/1999 |
| (Continued) | | |

*Primary Examiner* — Gregg Cantelmo
(74) *Attorney, Agent, or Firm* — Kelly McGlashen; Maginot, Moore & Beck LLP

(57) ABSTRACT

An electrochemical cell includes a cell housing and an electrode assembly disposed in the cell housing. The electrode assembly includes an electrode pair that is arranged to form a winding having a polygonal spiral wound shape in which a radius of the corner portions of each turn of the winding is constant, regardless of the number of turns. In addition, a length of the linear portions of one turn of the winding is different than a length of the linear portions of another turn of the winding. Since each turn of the winding includes the corner portions having a desired radius, the volumetric efficiency of the electrode assembly including the winding within a cell housing is improved relative to some cells that use conventional windings. An apparatus and method of forming a polygonal spiral wound winding are disclosed.

8 Claims, 8 Drawing Sheets

(51) Int. Cl.
*H01M 10/04* (2006.01)
*H01M 10/0525* (2010.01)

(52) U.S. Cl.
CPC ..... *H01M 10/0431* (2013.01); *H01M 10/052* (2013.01); *H01M 10/0525* (2013.01); *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | |
|---|---|---|
| 6,223,784 B1 | 5/2001 | Kirschner |
| 6,713,211 B2 | 3/2004 | Morishita et al. |
| 6,777,130 B2 | 8/2004 | Kasahara et al. |
| 8,530,068 B2 | 9/2013 | Urano et al. |
| 2017/0125850 A1* | 5/2017 | Kim ..................... B65H 75/08 |

FOREIGN PATENT DOCUMENTS

| | | |
|---|---|---|
| JP | 2003-100339 | 4/2003 |
| JP | 2005-051985 | 2/2005 |
| JP | 2008-066089 | 3/2008 |
| WO | 2003/040012 A1 | 5/2003 |

\* cited by examiner

WOUND ELECTRODE ASSEMBLY FOR AN ELECTROCHEMICAL CELL, AND METHODS AND DEVICES FOR MANUFACTURE OF SAME

CROSS REFERENCE TO RELATED APPLICATION

This application is a divisional of U.S. patent application Ser. No. 15/082,743, filed Mar. 28, 2016, now U.S. Pat. No. 10,224,574 issued on Mar. 5, 2019, the entirety of which is incorporated by reference herein.

BACKGROUND

1. Field of the Invention

The disclosure relates to an electrochemical cell including a spiral wound electrode assembly and to a method of winding the electrode assembly in the spiral configuration. In particular, disclosure relates to an electrochemical cell including a spiral wound electrode assembly having a polygonal shape when viewed in cross-section, and to a method of spiral winding the electrode assembly to have a polygonal shape.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells within a module are electrically connected in series or in parallel. Likewise, the battery modules within a battery pack are electrically connected in series or in parallel.

Some battery packs used with conventional hybrid electric vehicles are designed to provide a relatively high voltage, for example 400 volts (V). To achieve the high voltage, battery packs include hundreds of electrochemical cells, and thus may be very large. To reduce the space requirements of the battery pack, improvements in space utilization (volumetric efficiency) within the battery pack, the module and the cell is desired.

Different cell types have emerged in order to deal with the space requirements of a very wide variety of installation situations, and the most common types used in automobiles are cylindrical cells, polygonal (i.e., prismatic) cells, and pouch cells. Regardless of cell type, each cell may include a cell housing and an electrode assembly disposed in the cell housing. The electrode assembly may be provided, for example, in a stacked configuration or a rolled configuration. The stacked configuration may include a series of stacked positive electrode plates that alternate with negative electrode plates and are separated by intermediate separator plates. The rolled configuration may include an electrode pair formed of an elongate positive electrode stacked with an elongate negative electrode and separated by a separator. The rolled configuration may be formed by winding the electrode pair on a mandrel. For example, the mandrel may be rotated about a winding axis, and the electrode pair is wound onto the mandrel. The mandrel is often circular in cross-sectional shape, and the electrode pair wound onto it forms a winding having a cylindrical shape. Although spindles having a rectangular or flat shape have been used to try to form a winding having a rectangular cross-sectional shape, the outer layers of the resulting winding may have rounded corners, where the radius of the rounded corners increases with the number of turns of the winding.

The volumetric efficiency of a polygonal cell that includes a wound electrode assembly is low relative to other configurations since the electrode assembly may include rounded corners that do not fill interior corners of the polygonal cell housing. A need exists for improved usage of the internal volume of a polygonal cell that includes a rolled electrode assembly.

SUMMARY

In some aspects, an electrochemical cell includes an electrode assembly disposed within a cell housing. The electrode assembly is formed of a stacked electrode pair that includes a positive electrode, a negative electrode and a separator disposed between the positive electrode and the negative electrode. The electrode pair is arranged in a spiral wound configuration that includes corner portions disposed at an intersection between adjacent linear portions. In particular, the electrode pair is arranged to form a polygonal spiral wound configuration in which a radius of the corner portions of each turn of the polygonal spiral wound configuration is constant, regardless of the number of turns. In addition, a length of the linear portions of one turn of the winding is different than a length of the linear portions of another turn of the winding. The electrochemical cell thus may include a winding having a variable length and constant radius, that is, the radius of the corner portions of each turn remains constant irrespective of the number of turns, and the length of the linear portions varies. The radius of the corner portions of the outermost layer of the winding can thus be set to correspond to those of a desired polygonal shape. For example, a rectangular winding can be formed for a use in a prismatic cell housing having high volumetric efficiency.

This can be compared to some conventionally wound electrode pairs in which the length of the linear portion does not change with each turn, but the radius of each corner increases with each turn. The following equation (equation 1) may guide such a conventionally wound electrode pair:

$$\text{Length of Winding}=(a*\text{length of side}*n)+(b*2*\Sigma*R*n*\phi/360) \quad \text{(equation 1):}$$

In equation 1,
a=Number of sides of the polygon (assuming all sides are equal)
b=Number of corners of the polygon, where the term "corner" refers to area corresponding to the intersection of two adjacent sides
r=Radius of the corner
ø=Angle of the corner
n=Number of turns
R=Σnr It will be observed that in such a conventionally wound electrode pair, over every turn, the length of the side does not change but the radius of each corner increases by a factor of nr (depending on the turn). Thus, such conventionally wound electrode pairs can be considered to have a constant length and variable radius. As the number of turns increases, the radius increases and thus the volumetric efficiency of the electrode assembly within a cell housing decreases.

In some aspects, an electrode assembly includes a stacked electrode pair. The electrode pair includes a positive electrode, a negative electrode and a separator disposed between the positive electrode and the negative electrode. The electrode pair is arranged in a multi-turn, spiral wound configuration to form a winding that includes corner portions disposed between linear portion. A radius of the corner portions of each turn of the winding is constant, regardless of the number of turns.

The electrode assembly may include one or more of the following features: A length of the linear portions of one turn of the winding is different than a length of the linear portions of another turn of the winding. A length of consecutive linear portions within a single turn of the winding decreases in a direction from an outermost end of the electrode pair toward an innermost end of the electrode pair.

In some aspects, an electrochemical cell includes an electrode assembly disposed within a cell housing. The electrode assembly includes a stacked electrode pair that includes a positive electrode, a negative electrode and a separator disposed between the positive electrode and the negative electrode. The electrode pair is arranged in a multi-turn, spiral wound configuration to form a winding that includes corner portions disposed between linear portions. A radius of the corner portions of each turn of the winding is constant, regardless of the number of turns.

The electrochemical cell may include one or more of the following features: A length of the linear portions of one turn of the winding is different than a length of the linear portions of another turn of the winding. A length of consecutive linear portions within a single turn of the winding decreases in a direction from an outermost end of the electrode pair toward an innermost end of the electrode pair.

In some aspects, a method of manufacturing an electrode assembly for use in an electrochemical cell includes the following method steps: Providing a positive electrode, a negative electrode and a separator disposed between the positive electrode and the negative electrode, the positive electrode, the separator and the negative electrode arranged in a layered configuration to form an electrode stack; and winding the electrode stack about a winding axis in a spiral configuration in which an outermost layer of the wound electrode stack is wound first, and an innermost layer of the wound electrode stack is wound last.

The method may include one or more of the following features and/or additional steps: Each layer of the wound electrode stack is formed having corners, and a radius of the corners of the outermost layer is the same as a radius of a layer wound subsequently to the outermost layer. The method includes winding the electrode stack into a polygonally-shaped winding having the spiral configuration by forming the outermost layer of the polygonally-shaped winding into a polygonal shape when viewed in a cross-section that is transverse to the winding axis. The method includes subsequently arranging additional layers on an inner side of the outermost layer. Each additional layer has a polygonal shape when viewed in the cross-section that is transverse to the winding axis. The method includes providing a second winding having a spiral configuration, and electrically connecting the second winding to an innermost end of the polygonally shaped winding. The second winding is a jelly roll winding that is free of corners. The method includes providing a polygonal frame, and the step of winding the electrode stack includes overlying the electrode stack along an inner surface of the frame. The step of overlying the electrode stack includes continuously arranging the electrode stack within the frame such that a layer of the electrode stack is placed upon the inner surface of the frame one side of the frame at a time and upon each side of the n sides of the frame in a serial manner, and subsequent layers of the electrode stack are placed upon an inner surface of the layer.

In some aspects, a device is configured to wind material about a winding axis to form a spiral of material in which an outermost layer of the spiral has a polygonal shape defined by n sides when seen in a cross-section perpendicular to the winding axis, where n is an integer corresponding to the number of sides of the polygonal shape, and the outermost layer of the spiral is wound first, and an innermost layer of the spiral is wound last. The device includes independent pushing elements. The number of pushing elements is at least the number of sides of the polygonal shape. Each pushing element is movable relative to an adjacent pushing element, and each pushing element is configured to be applied to an inward-facing surface of a portion of the material, and to urge the portion of material in a direction away from the winding axis.

The device may include one or more of the following features: The material comprises an electrode pair, the electrode pair including a positive electrode, a negative electrode and a separator disposed between the positive electrode and the negative electrode. The device further comprises a polygonal frame having n side walls, and the pushing elements are disposed within, and movable relative to, the frame. Each of the pushing elements is constrained to move along a path that extends radially from the winding axis, and the path of a given pushing element is different than the path of the remaining pushing elements. The pushing elements comprise a segmented mandrel, the mandrel including independent segments. The mandrel is centered on the winding axis. Each segment is constrained to move along an axis that extends in a direction that is radial relative to the winding axis. The mandrel is disposed within a polygonal frame having n sides and n corners, and an outer surface of at least some of the segments has a radius that corresponds to a radius of the corners. The number of segments corresponds to 2*n. Each of the pushing elements comprises a roller assembly including a roller that freely rotates about a roller axis, and each roller axis is parallel to the winding axis. The roller axis of a given segment is movable relative to a roller axis of an adjacent segment. The roller is elongated in a direction parallel to the roller axis. Each roller is constrained to move along an axis that extends in a direction that is radial relative to the winding axis. The roller assemblies are disposed within a polygonal frame having n sides and n corners, and an outer surface of at least some of the rollers have a radius that corresponds to a radius of the corners. The number of roller assemblies corresponds to 2*n. Each of the roller assemblies includes a pin having a longitudinal axis that corresponds to the roller axis, a sleeve that surrounds, and rotates relative to the pin, and an elastic element connected to the pin that urges the pin to move in a radially outward direction relative to the winding axis. The frame includes corners disposed at intersections of adjacent side walls, and at least some of the pushing elements are configured to urge the material into the corners of the frame.

DETAILED DESCRIPTION

Figure 1:
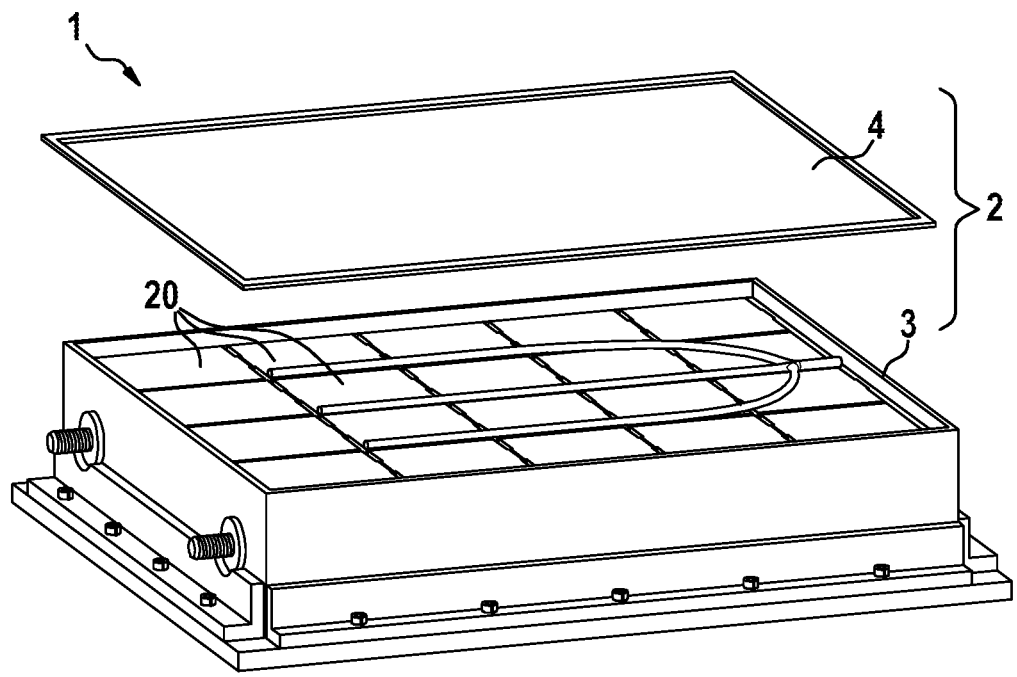
FIG. 1 a partially exploded perspective view of a battery pack including an array of cubic cells.
Figure 2:
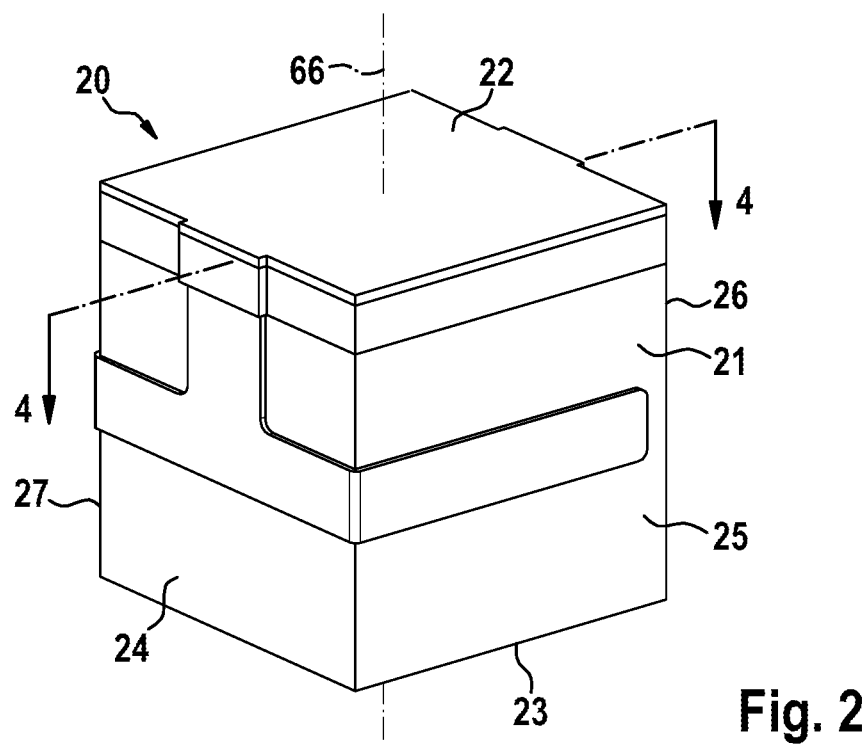
FIG. 2 is a perspective view of a cubic cell.
Figure 3:
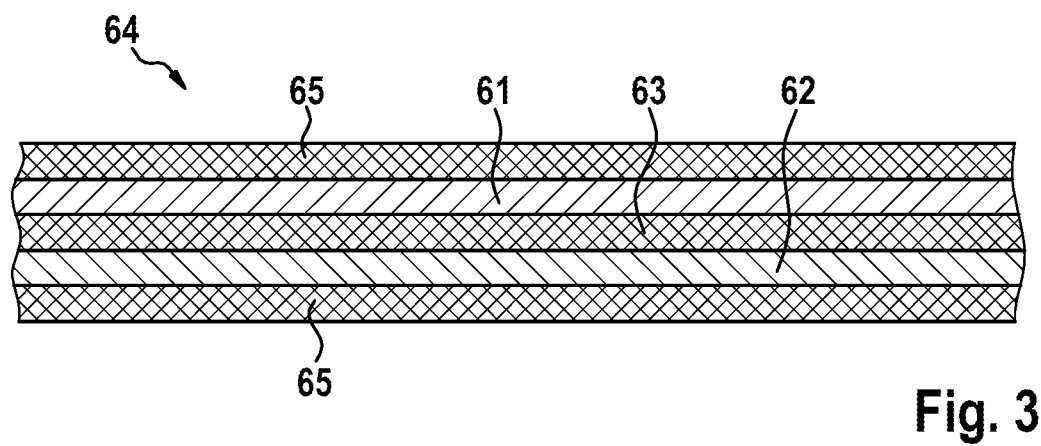
FIG. 3 is a cross-sectional view of a portion of an electrode pair.

Referring to FIGS. 1-3, a battery pack 1 is a power generation and storage device that includes electrochemical cells 20 that are electrically interconnected and stored in an organized manner within a battery pack housing 2. The battery pack housing 2 includes a container portion 3 and a detachable lid 4. The cells 20 are lithium-ion pouch cells that include an electrode assembly 60 (FIG. 3) that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery pack housing 2, the cells 20 are electrically connected in series or in parallel.

Each cell 20 includes a polygonal pouch-type cell housing 21 formed of a metal laminated film. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

Figure 4:
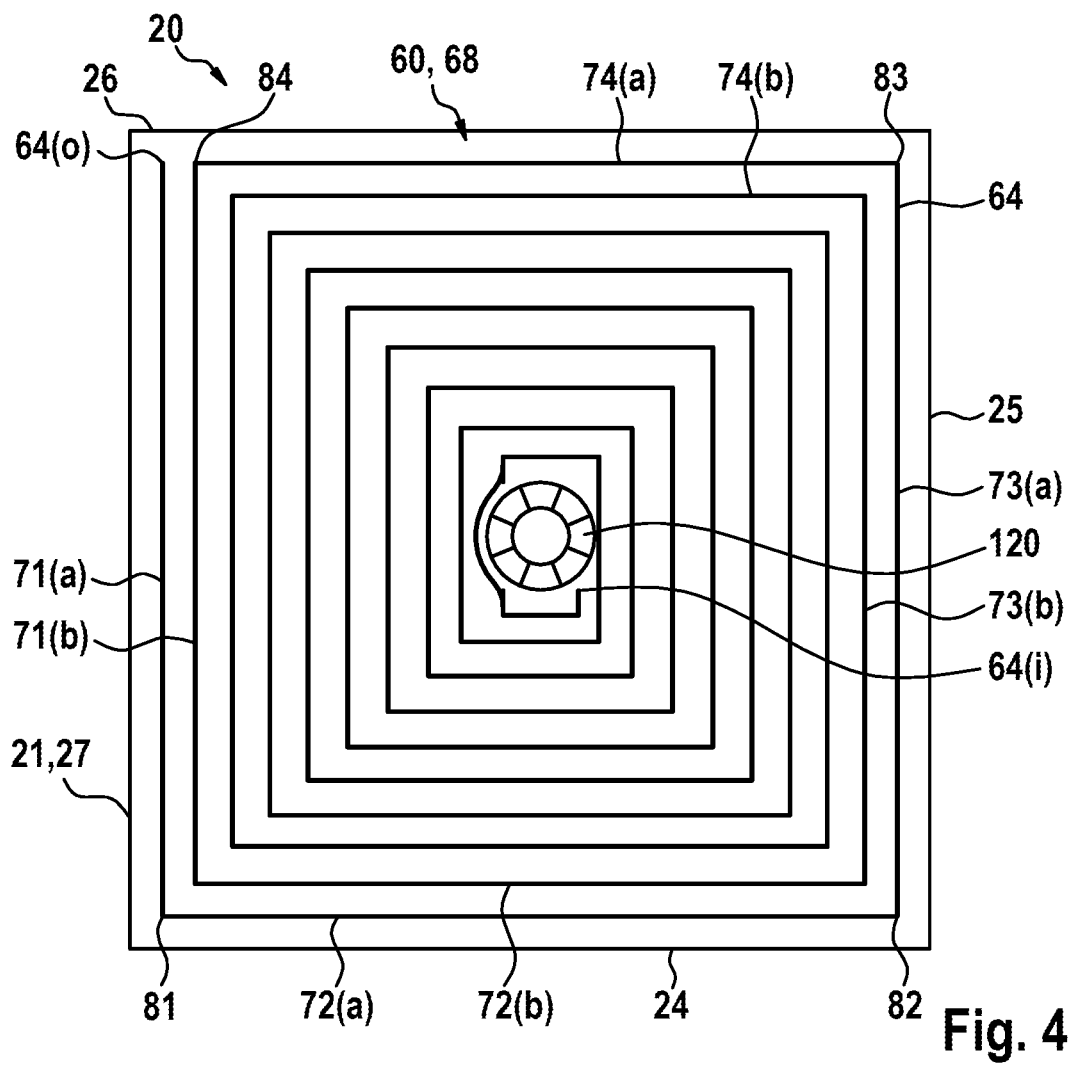
FIG. 4 is a schematic cross sectional view of the cubic cell of FIG. 2 as seen across line 4-4 of FIG. 2.

Referring to FIG. 3-4, the electrode assembly 60 disposed in the cell 20 includes an elongated positive electrode plate 61 that is stacked (e.g., layered) with an elongated negative electrode plate 62 and separated by an intermediate elongated separator plate 63 to form an electrode pair 64. The electrode pair 64 may also include an additional separator plate 65 that is disposed on one or both of the outward-facing surfaces of the positive and negative electrode plates 61, 62. The positive and negative electrode plates 60, 61 are very thin (e.g., having a thickness on the order of about 0.095 to 0.145 mm) compared to the overall cell thickness (e.g. having a thickness on the order of tens or hundreds of mm) and thus are illustrated schematically in FIGS. 3 and 4.

The positive and negative electrodes 61, 62 each have a layered structure to facilitate insertion and/or movement of lithium-ions. In the illustrated embodiment, the positive electrode 61 is formed of copper with a graphite coating, and the negative electrode 62 is formed of aluminum with a lithiated metal oxide coating. The separators 63, 65 are formed of an electrically insulating material such as a tri-layer polypropylene-polyethylene-polypropylene membrane.

The electrode pair 64 is arranged in a polygonal spiral wound configuration, referred to hearinafter as winding 68. In the illustrated embodiment, the winding 68 is arranged in a square spiral wound configuration to correspond to the square cross-sectional shape of the cell housing 21.

Each turn of the winding 68 includes four corner portions 81, 82, 83, 84 disposed between four linear portions 71, 72, 73, 74, wherein the radius r of the corner portions 81, 82, 83, 84 of each turn of the winding 68 is constant, regardless of the number of turns n. In addition, the length of the linear portions 71(*a*), 72(*a*), 73(*a*), 74(*a*) of one turn, for example turn a, of the winding is different than a length of the linear portions 71(*b*), 72(*b*), 73(*b*), 74(*b*) of another turn, for example turn b, of the winding 68. In addition, the length of the consecutive linear portions 71(*a*), 72(*a*), 73(*a*), 74(*a*) within a single turn, for example turn a, decrease in a direction from the outermost end 64(*o*) of the electrode pair toward the innermost end 64(*i*) of the electrode pair 64.

Referring to FIGS. 5-10, during manufacture of the electrode assembly 60, the electrode pair 64 is continuously wound about a winding axis 66 in a pattern in which an outermost layer of the winding 68 is wound first, and an innermost layer of the winding 68 is wound last. Moreover, the outermost layer of the winding 68 is formed into a polygonal shape and additional layers are subsequently arranged on an inner side of the previous layer. The additional, layers each have a polygonal shape.

A winding device 100 is used to form the polygonal spiral wound configuration of the winding 68. The winding device 100 includes a frame 102 and a segmented mandrel 120 that is disposed in the frame 102. In the illustrated embodiment, the frame 102 is a polygonal tubular structure having side walls arranged to form a closed section when viewed in cross-section, and that is dimensioned and arranged to correspond to the dimensions and arrangement of the side walls 24, 25, 26, 27 of the cell housing 21. In the illustrated embodiment in which the cell housing 21 is square in cross-section (e.g., a polygon having four sides), the frame 102 is a square tubular structure having four orthogonal side walls 103, 104, 105, 106. In addition, the intersections of adjacent frame side walls define four corners 111, 112, 113, 114, each corner 111, 112, 113, 114 having an inner radius r.

The mandrel 120 is a cylindrical entity that includes individual segments 122 (e.g., 122*a*, 122*b*, 122*c*, 122*d*, 122e, 122f, 122g, 122h) that are movable relative to each other and the frame 102. Each segment 122 has the shape of a sector or of a truncated sector, and is used in cooperation with the other segments 122 to both position and support the electrode pair 64 during the winding process. The number of segments 122 is twice the number a of sides of the desired polygonal shape. In the illustrated embodiment in which the winding 68 is arranged in a square spiral wound configuration, the number a is four and the number of segments 122 is eight. There are two types of segments 122, which are arranged in an alternating manner to form an outer periphery of the mandrel 120. In particular, there are corner segments 122a, 122c, 122e, 122g that are configured to urge portions of the electrode pair 64 into the respective frame corners 111, 112, 113, 114, and there are side segments 122b, 122d, 122f, 122h that are configured to urge other portions of the electrode pair 64 toward the frame side walls 103, 104, 105, 106. At least the corner segments 122a, 122c, 122e, 122g have a frame-facing surface 123 that is curved to correspond to an inner radius of the frame corners 111, 112, 113, 114. In the illustrated embodiment, all of the segments 122a, 122b, 122c, 122d, 122e, 122f, 122g, 122h have a frame facing that is curved to correspond to an inner radius r of the frame corners 111, 112, 113, 114.

Figure 8:
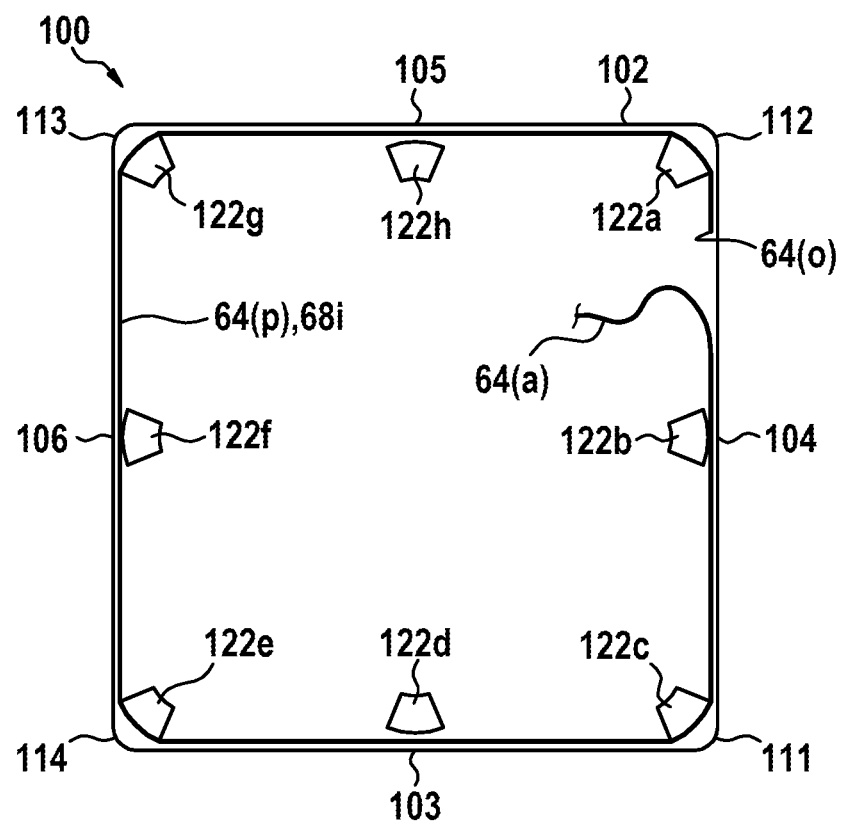
FIG. 8 is a top plan View of a portion of the winding device of FIG. 5, illustrating the mandrel in in the fully advanced position with a portion of the electrode assembly disposed between the mandrel and the frame.

In the winding device 100, the mandrel 120 is generally centered within the frame 102, and one segment 122 of the mandrel 120 is associated with each one of the frame side walls 103, 104, 105, 106 or frame corners 111, 112, 113, 114. The segments 122 are configured to move outward and inward along a linear path that extends in a radial direction relative to a center of the mandrel 120. The mandrel 120 is oriented such that each corner segment 122a, 122c, 122e, 122g moves along a radius of the associated one of the respective frame corners 111, 112, 113, 114, and such that each side segment 122b, 122d, 122f, 122h moves in a direction perpendicular to the associated one of the respective frame side walls 103, 104, 105, 106. The segments are moveable between a fully retracted position (FIG. 5) and an advanced position (FIG. 8). In the fully retracted position, the segments 122 are closely arranged such that side surfaces of each segment 122 face the side surfaces of adjacent segments, and the segments 122 together form a cylinder. In the advanced position, each segment 122 is moved radially outward relative to the retracted position, whereby the mandrel 120 as a whole is expanded outward. In particular, each segment 122 moves outward along its radial path until it abuts an inner surface 109 of the frame 102 or a fixed intervening structure, as discussed below.

Each segment 122 is connected to an actuator 92 (FIG. 10), for example via a rigid arm (not shown). The actuator 92 is configured to position the segment 122 relative to the frame by providing the required radial movement. The actuator 92 may be, for example, a mechanical, electromechanical and/or pneumatic device, and may be controlled using a controller 90 that also controls an electrode pair feed device 94. In particular, the controller 90 controls the rate, position and/or tension of the feeding of the electrode pair 64 into the winding device 100. In use, the electrode pair 64 is fed continuously into the device 100 via the feed device 94 so as to be disposed between the mandrel 120 and the frame 102.

Figure 5:
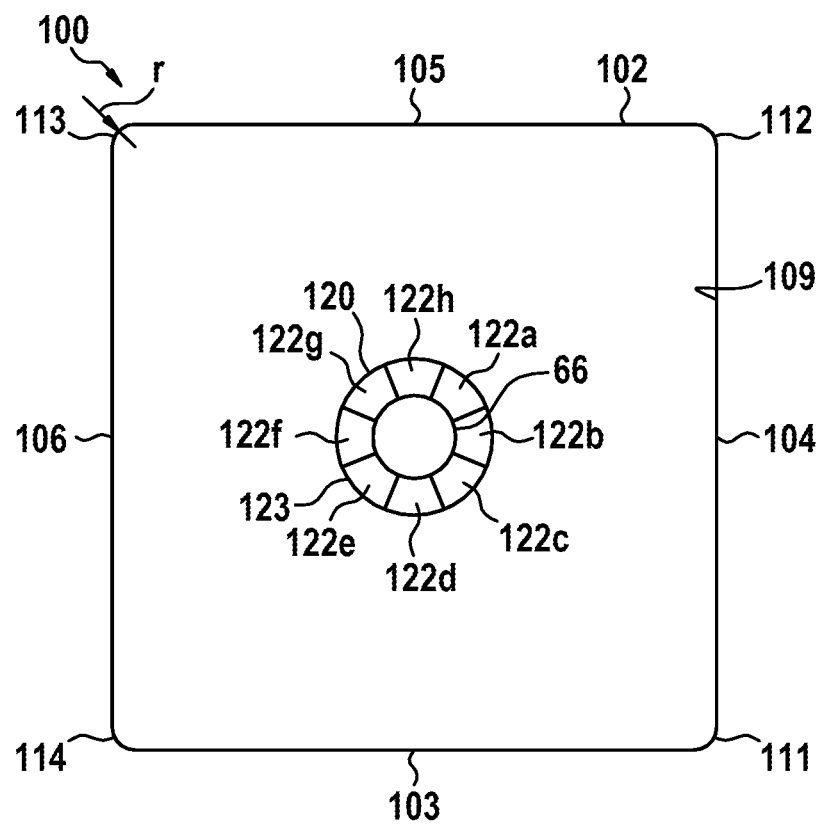
FIG. 5 is a top plan view of a portion of a winding device including a segmented mandrel disposed in a frame, illustrating the mandrel in the fully retracted position.
Figure 6:
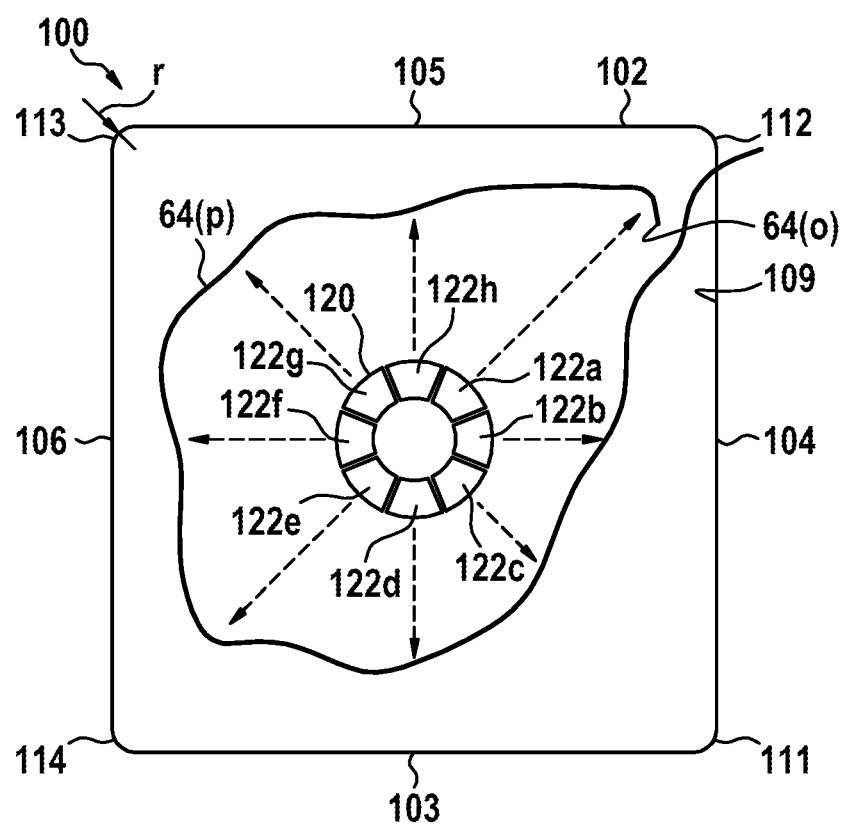
FIG. 6 is a top plan view of a portion of the winding device of FIG. 5, illustrating the mandrel in the fully retracted position with a portion of the electrode assembly disposed between the mandrel and the frame.
Figure 7:
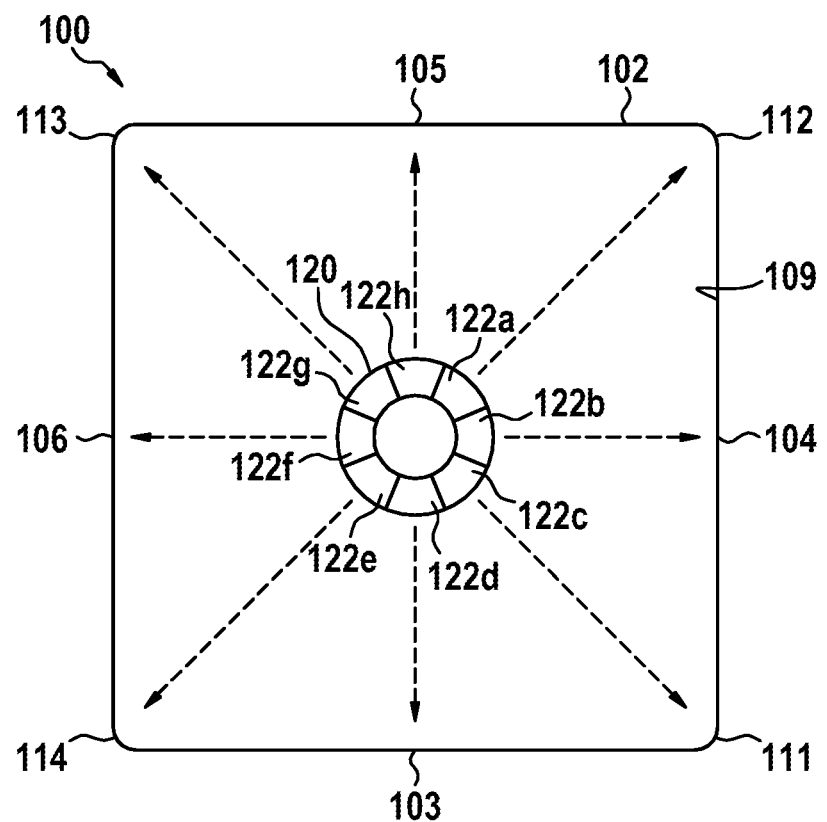
FIG. 7 is a top plan view of a portion of the winding device of FIG. 5, illustrating using dashed arrows the outward motion of the segments of the mandrel.

Prior to placement of the initial turn 68i of the winding 68, the mandrel 120 is disposed in a center of the frame 102 in the retracted position (FIG. 5). To form the initial turn 68i, the leading end 64(o) of the electrode pair 64 along with a portion 64(p) of the electrode pair 64 adjacent the leading end 64(o) are placed within the frame 102 so as to be disposed between the mandrel 120 and an inner surface 109 of the frame 102, and so as to generally surround the mandrel 120 (FIG. 6). The segments 122 are then moved to the advanced position (FIGS. 7, 8). The movements of the individual segments 122 cause the portion 64(p) of the electrode pair 64 to move outward, and additional portions of the electrode pair 64 may be drawn into the frame 102. The actuator 92 provides sufficient force to move the electrode pair portion 64(p) outward until it abuts the frame inner surface 109. As a result, the electrode pair portion 64(p) abuts the inner surface of the frame 102 along the entire circumference of the frame inner surface 109, and forms the initial turn 68i (FIG. 8).

Figure 9:
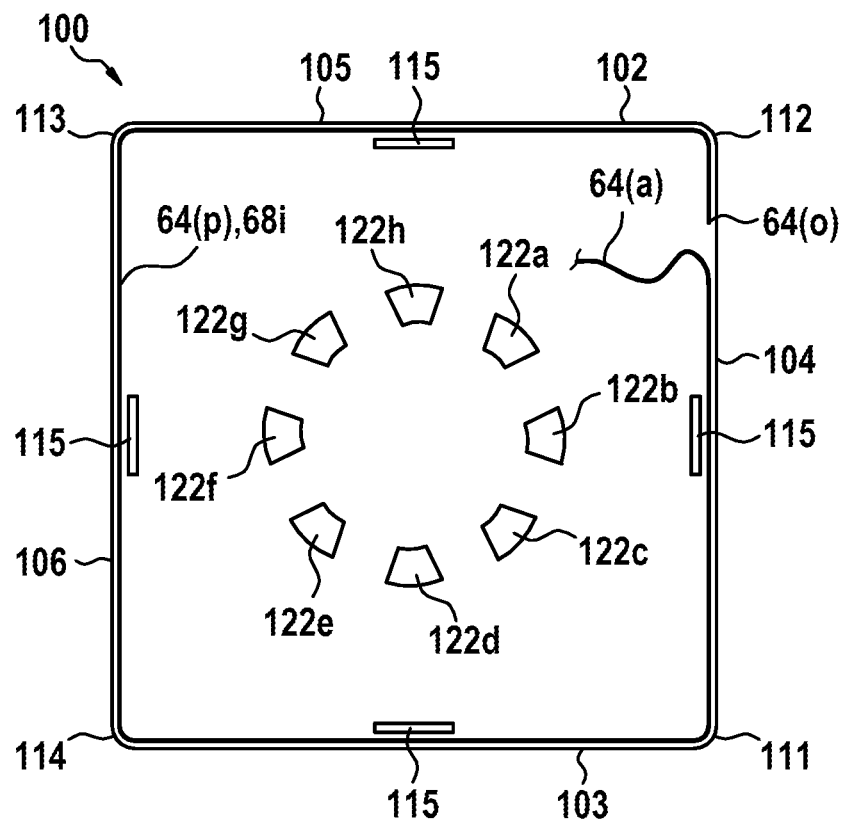
FIG. 9 is a top plan view of a portion of the winding device of FIG. 5, illustrating the mandrel in in a partially retracted position with a portion of the electrode assembly retained against an inner surface of the frame via clips.
Figure 10:
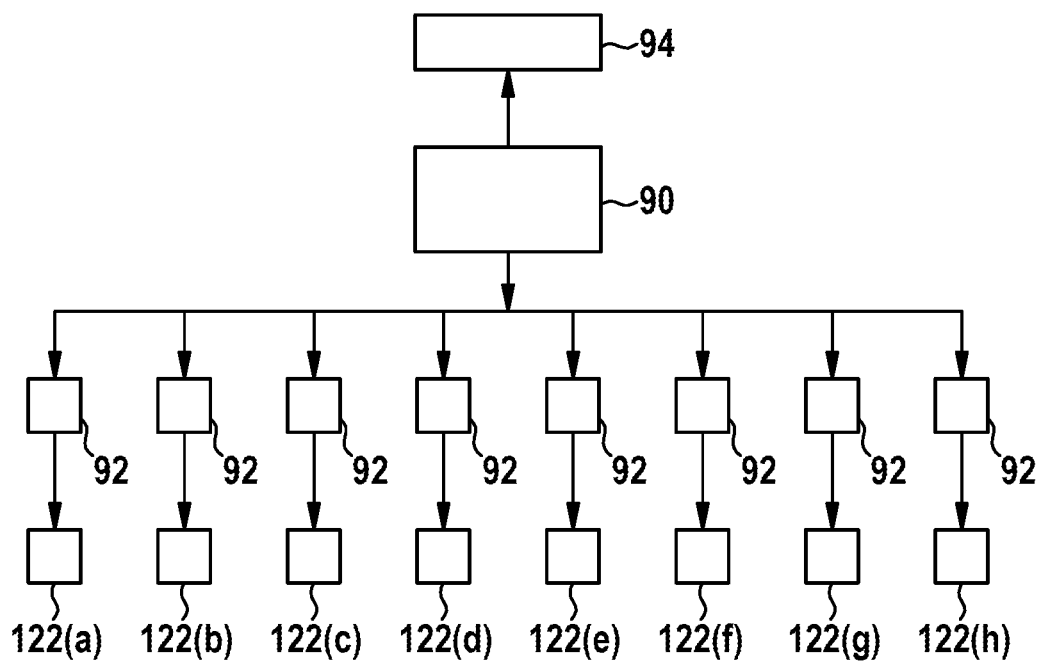
FIG. 10 is a schematic illustration of a control system for the winding device of FIG. 5.

After placement of the initial turn 68i, the segments 122 are retracted so that space exists between an outer surface of the segments 122 and the frame inner surface 109. In some embodiments, the electrode pair 64 has sufficient structural integrity that it remains in place against the frame 102 upon retraction of the segments 122. In other embodiments, retainers such as clips 115 may be used to retain the electrode pair 64 in place against the frame 102 upon retraction of the segments 122 (FIG. 9).

Figure 11:
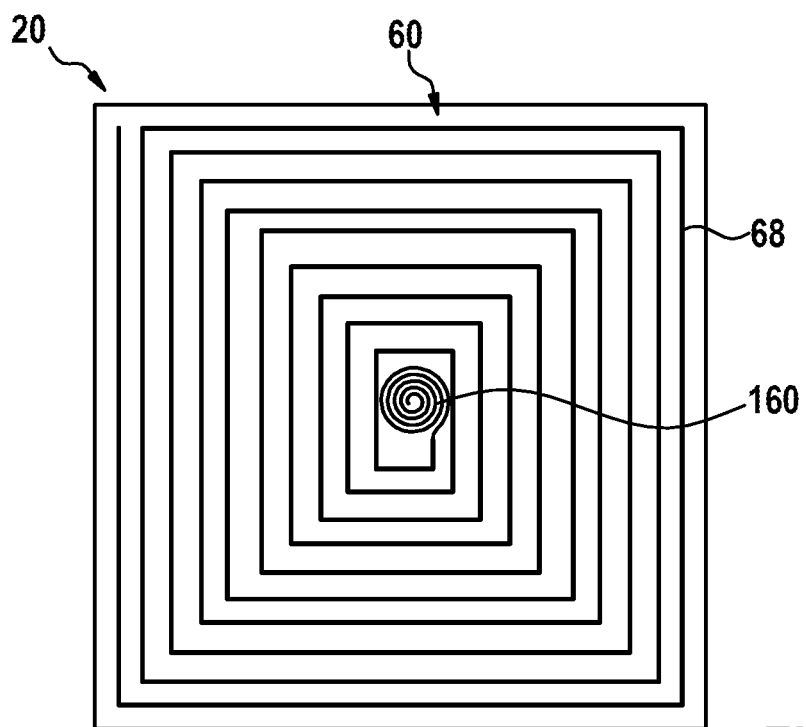
FIG. 11 is a schematic cross sectional view of an alternative cubic cell as seen across line 4-4 of FIG. 2 illustrating a secondary electrode disposed in a center of the polygonal electrode.

Layering of the initial turn 68i of the winding 68 on the frame inner surface 109 is followed by providing adding subsequent turns onto the respective inner surfaces of the previous turns. This is achieved by alternating placement of an additional portion 64a of the electrode pair within the frame 102 so as to be disposed between the mandrel 120 and an inner surface 109 of the frame 102 so as to generally surround the mandrel 120, moving, the segments 122 to the advanced position so as to properly position the additional portion 64a, and then retracting the segments 122. The procedure may be repeated continuously until layers of electrode material fill the space between the fully retracted mandrel 120 and the frame 102. In some embodiments, the mandrel 120 remains within the winding 68 during use within the cell 20 (FIG. 4). In other embodiments, the mandrel 120 is removed from the electrode assembly 60, and a second electrode assembly 160 may be inserted into the vacancy that results from the removal of the mandrel 120. The second electrode assembly 160 may be, for example, a circular or oval shaped jelly roll assembly that forms an electrical connection with the polygonal electrode assembly 60 (FIG. 11). By filling the vacancy with electrode material, the volumetric efficiency of the cell 20 may be further improved.

In some embodiments, during advancement and/or retraction of the segments 122, all segments 122 may be moved simultaneously and in unison (e.g., all segments move outward at the same time, and move inward at the same time). In other embodiments, each segment 122 may be moved individually in a serial manner. For example, each segment 122 may be moved individually and sequentially in clockwise order as seen in top plan view (i.e., one segment 122b moving subsequent to the movement of the adjacent segment 122a).

Figure 12:
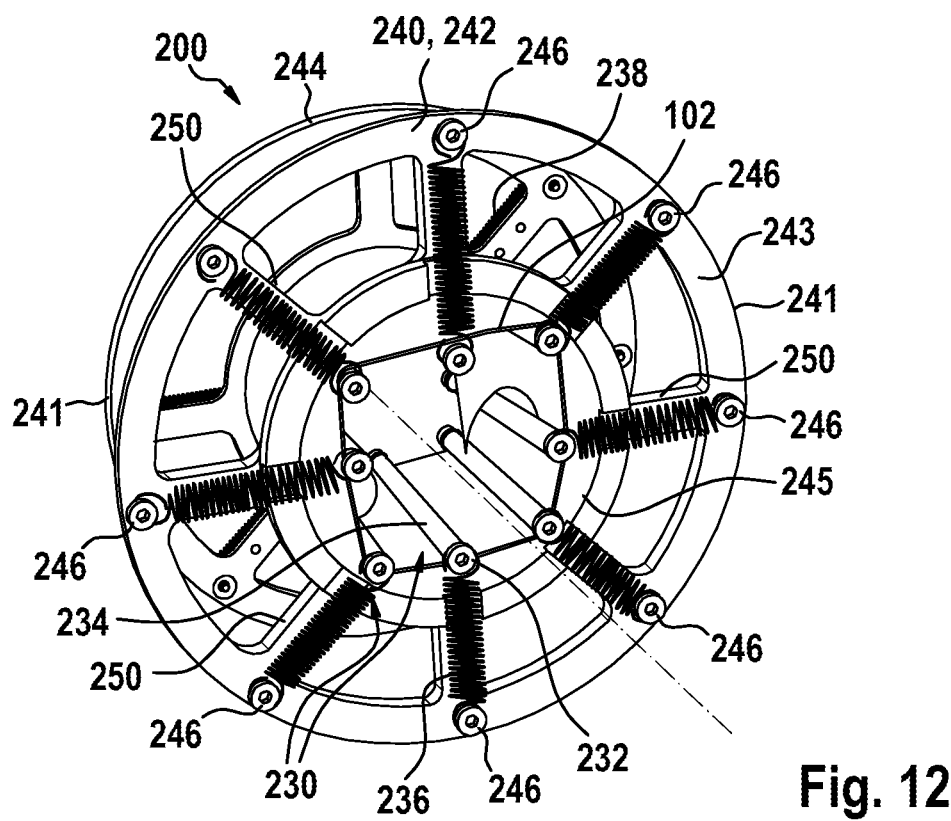
FIG. 12 is a perspective view of an alternative winding device with the cover omitted to permit visualization of the inner frame, the outer frame, and the roller assemblies.
Figure 13:
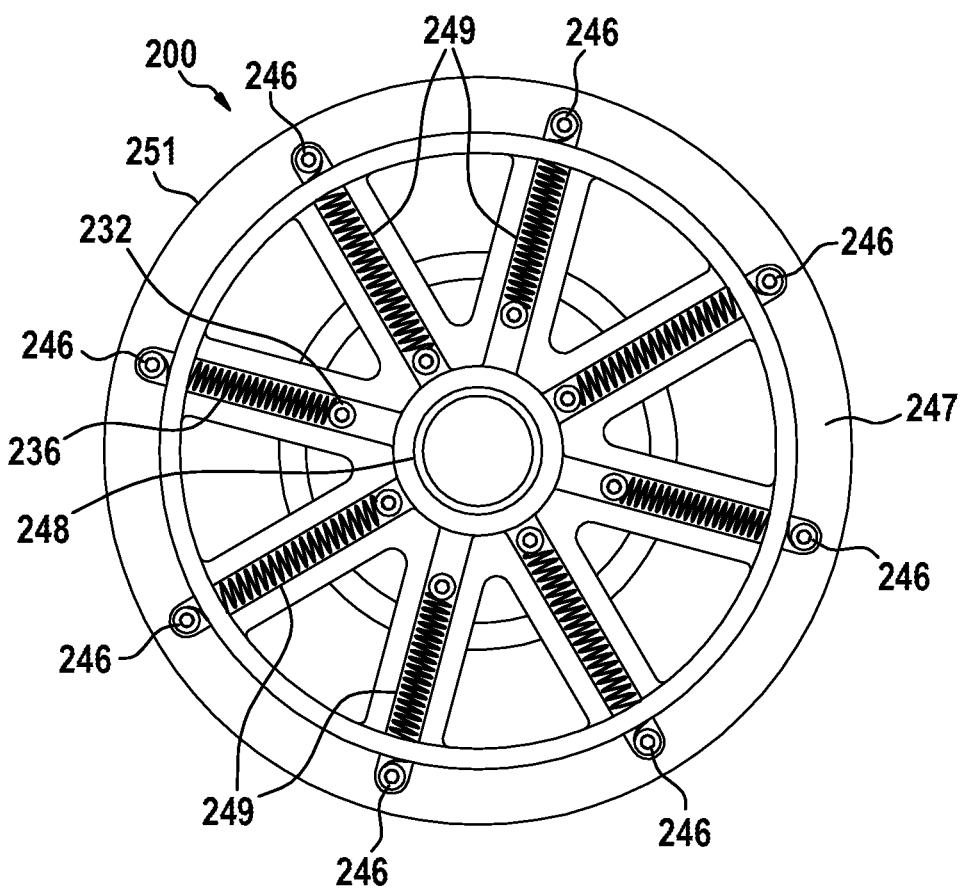
FIG. 13 is a top plan view of the winding device of FIG. 11.

Referring to FIGS. 12 and 13, an alternative winding device 200 may be used to form the polygonal winding 68. In particular the winding device 200 may be used to continuously wind the electrode pair 64 about a winding axis 66 in a pattern in which an outermost layer of the winding 68 is wound first, and an innermost layer of the winding 68 is wound last, and in which the each layer of the winding 68 is formed into a polygonal shape.

The winding device 200 includes an outer frame 240, an inner frame 102 and several roller assemblies 230. The inner frame 102 and the roller assemblies 230 are supported on the outer frame 240, as discussed further below. The outer frame 240 includes a first platform 242 and a second platform 244 that is spaced apart from the first platform 242. The second platform 244 is parallel to the first platform 242, and the peripheral edges 241 of the first and second platforms 242, 244 are aligned.

The first and second platforms 242, 244 are substantially the same, and thus only the first platform 242 will be described in detail. In the illustrated embodiment, the peripheral edge 241 of the first platform 242 has a circular profile, but the peripheral edge 241 is not limited to this shape. The first platform 242 has a central opening 245. A diameter of the first platform central opening 245 is greater than the dimension of the largest diagonal of the polygonal shape of the winding 60, whereby the inner frame 102 can reside within the first platform central opening 245.

In addition, a plurality of posts 246 protrude outward from an outward-facing surface 243 of the first platform 242. The posts 246 are used to support the roller assemblies 230, as discussed further below. The posts 246 are disposed between the central opening 245 and the peripheral edge 241. In addition, the posts 246 are equidistantly spaced apart from each other about a circumference of the central opening 245.

The first platform 242 includes a cover 247 that overlies the outward facing surface 243. The peripheral edge 251 of the cover 247 has the same size and shape as the peripheral edge 241 of the first platform 242. The cover 247 includes a central opening 248 having a smaller diameter than the diameter of the first platform central opening 245. In some embodiments, the electrode pair 64 may be fed into the winding device 200 via the cover central opening 248. In addition the cover 247 includes elongated guide slots 249 that are used to guide the motion of the roller assemblies 230, as discussed further below. The number of guide slots 249 corresponds to the number of posts 246. The guide slots 249 are formed in an inward facing surface of the cover 247, and extend in a radial direction. In the illustrated embodiment, the guide slots 249 are through-openings that open on both the inward and outward facing surfaces of the cover 247, and have a length that is slightly less than the radial distance between the peripheral edge 251 and the cover central opening 248. When assembled with the first platform 242, the cover 247 is oriented such that each post 246 is aligned with, and received within, a corresponding one of the guide slots 249.

The first platform 242 is arranged relative to the second platform 244 such that each post 246 and corresponding guide slot 249 of the first platform 242 is aligned with a corresponding post 246 and corresponding guide slot 249 of the second platform 244. In some embodiments, a pair of struts 250 may be positioned on opposed sides of the central opening 245. The struts 250 extend between the respective inward-facing surfaces of the first and second platforms 242, 244, and maintain the spacing between, and relative orientations of, the first platform 242 and the second platform 244.

Each roller assembly 230 includes an elongated, cylindrical sleeve 234, a pin 232 that extends through the sleeve 234 and protrudes from opposed ends of the sleeve 234, a first coil spring 236 that is connected to a first end of the pin 232, and a second coil spring 238 that is connected to a second end of the pin 232, where the second end is opposed to the first end. The sleeve 234 is rigid, and has a smooth outer surface that is used to engage a surface of the electrode pair 64. The sleeve 234 has a radius that is less than or equal to the radius of the corners of the inner frame 102. The sleeve 234 rotates freely about a longitudinal axis of the pin 232. Thus, the pin 232 and the sleeve 234 of each roller assembly 230 cooperate to provide a rolling element of that assembly. The pin 232 and sleeve 234 of each roller assembly 230 is disposed within the central openings 245 of the first and second platforms 242, 244 so as to extend in a direction perpendicular to the first and second platforms 242, 244. In addition, each roller assembly 230 is connected to the each of the first and second platforms 242, 244 via the first and second springs 236, 238. In particular, for each roller assembly 230, one end of the first spring 236 is connected to a post 246 on the outward-facing surface of the first platform 242, and one end of the second spring 238 is connected to the aligned post 246 on the outward-facing surface of the second platform 244.

For each roller assembly 230, the ends of the pins 232, as well as the first and second springs 236, 238, each reside within a corresponding guide slot 249. As a result, each roller assembly 230 is constrained to move along the corresponding guide slot 249 in a radial direction, and is configured to urge the rolling element in a radially outward direction.

The number of posts 246 provided on each platform 242, 244 corresponds to the number of roller assemblies 230, which in turn depends on the number of sides of the polygonal winding. The number of roller assemblies 230 is twice the number a of sides of the polygon. In the illustrated embodiment in which the winding 68 is arranged in a square spiral wound configuration, the number a is four and the number of roller assemblies 230 is eight.

The inner frame 102 is substantially similar to the frame 102 described above with respect to FIGS. 5-8, and thus a description of the inner frame 102 is not repeated and common reference numbers are used to refer to common elements. The inner frame 102 is disposed inside the outer frame 240. In particular, the inner frame 102 is rotatably supported within the central openings 245 of the first and second platforms 242, 244. The roller assemblies 230 are arranged such that the sleeves 234 are drawn against the inner frame inner surface 109 by the first and second springs 236, 238. As the inner frame 102 is rotated relative to the outer frame 240 about the winding axis 66, the sleeves 234 rotate about the pins 232, permitting the sleeves 234 to remain in contact with, and roll along, the inner frame inner surface 109. In addition, the roller assemblies 230 move in a reciprocating manner along the guide slots 249 as they follow the contours of the inner frame inner surface 109.

In use, the leading end 64(o) of the electrode pair 64 along with a portion 64(p) of the electrode pair 64 adjacent the leading end 64(o) are placed within the inner frame 102 so as to be disposed between the inner frame inner surface 109 and the roller assemblies 230. The roller assemblies 230 serve to clamp the electrode pair 64 against the inner frame inner surface 109.

As the inner frame 102 is rotated relative to the outer frame 240 about the winding axis 66, the roller assemblies 230 urge the electrode pair 64 against the inner frame inner surface 109. For example, as the inner frame 102 periodically passes through certain relative orientations relative to the outer frame 240, a roller assembly 230 is positioned in each one of the frame corners 111, 112, 113, 114, so as to form the corner portions of the winding 81, 82, 83, 84. While in this orientation, a roller assembly 230 is positioned against each one of the frame walls 103, 104, 105, 106. As the inner frame 102 continues to rotate, the roller assemblies 230 roll along the frame walls so as to form additional polygonally-shaped turns on the inner surface of the previously formed turns.

As the inner frame 102 is rotated, additional portions of the electrode pair 64 are continuously fed or drawn into the winding device 200 via the cover central opening 248, and laid upon an inner surface of a preceding layer. Rotation of the inner frame 102 continues until the thickness of the accumulated layers causes the roller assemblies 230 to abut each other and/or their movement is prevented. In some embodiments, the second electrode assembly 160 may be inserted into the vacancy that results from the removal of roller assemblies 230 from the winding 68. The second electrode assembly 160 may be, for example, a circular or oval shaped jelly roll assembly that forms an electrical connection with the polygonal electrode assembly 60 (FIG. 11). By filling the vacancy with electrode material, the volumetric efficiency of the cell 20 may be further improved.

Figure 14:
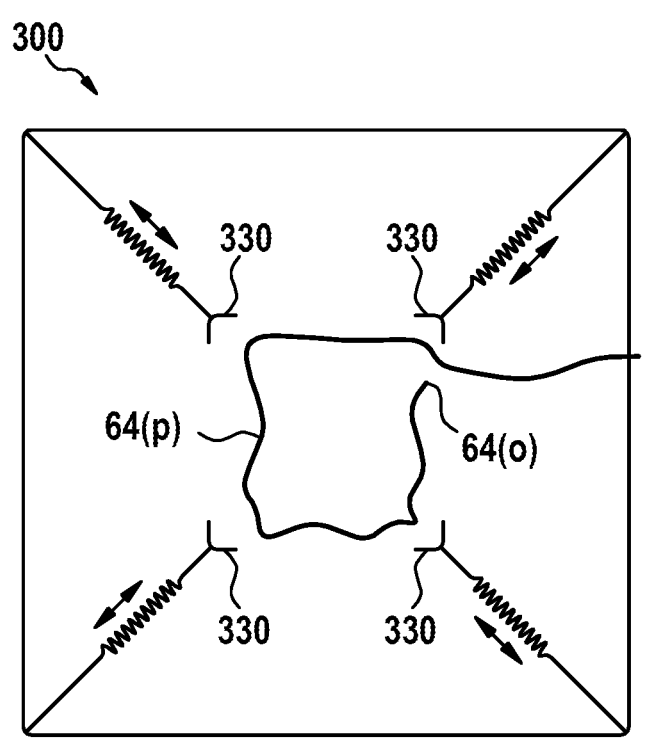
FIG. 14 is a top plan view of another alternative winding device.

In the illustrated embodiments, the winding 68 is formed by using pushing elements that urge portions of the electrode pair outward against a support member that may be an inner surface of a frame 102 or an inner surface of a preceding layer of the winding 68. However, methods of forming a polygonally-shaped winding are not limited to using pushing elements, for example mandrel segments 122 or roller assemblies 230, to push an electrode pair 64 outward and into the desired configuration. For example, referring to FIG. 14, suction elements 330 may be used to control a position of an outer surface of the electrode pair 64, by pulling the electrode pair 64 outward into a desired polygonal shape. In this approach, the leading end 64(*o*) of the electrode pair 64 along with a portion 64(*p*) of the electrode pair 64 adjacent the leading end 64(*o*) are pulled outward into a polygonal shape via the suction elements 330 to form an initial turn 68(*i*) of the winding 68. Subsequent layers of electrode material are added to an outer surface of the initial turn 68(*i*) in a continuous manner to form the polygonal winding 68.

In each of the illustrated embodiments, the electrode pair 64 is arranged in a spiral wound configuration that includes corner portions 81, 82, 83, 84 disposed at an intersection between adjacent linear portions 71, 72, 73, 74. In particular, the electrode pair 64 is arranged to form a polygonal spiral wound configuration in which a radius r of the corner portions 81, 82, 83, 84 of each turn of the polygonal spiral wound configuration is constant, regardless of the number of turns. In addition, a length of the linear portions 71(*a*), 72(*a*), 73(*a*), 74(*a*) of one turn of the winding 68 is different than a length of the linear portions 71(*b*), 72(*b*), 73(*b*), 74(*b*) of another turn of the winding 68. Since the layers, including the outermost layer, of the winding 68 includes the corner portions 81, 82, 83, 84 having a desired radius r, the volumetric efficiency of the electrode assembly 60 including the winding 68 within a cell housing 21 is improved relative to some polygonal cells that use conventional windings.

In the illustrated embodiments, the frame 102 is a tubular member (e.g., a member having open opposed ends) used in cooperation with the segmented mandrel 120 to form the winding 68. However, in other embodiments the frame 102 may alternatively be formed having multiple sides arranged in the form of a tube having one closed end, such as the shape of an open box. In other embodiments, the frame 102 is omitted, the mandrel 120 is placed within the cell housing 21 prior to its closure, and the cell housing 21 performs the function of the frame 102 during manufacture.

In the embodiment illustrated in FIGS. 5-9, the segments 122 may be numbered sequentially from 1 to 2n, and both the odd numbered segments and the even numbered segments have an outer peripheral shape that defines an outer corner and has a radius that is equal to or less than the radius of the frame corner. However, in some alternative embodiments, the odd numbered segments have an outer peripheral shape that defines an outer corner, and the even numbered segments have an outer peripheral shape that includes an outwardly facing flat portion to correspond to the flat shape of the frame wall inner surface.

Although the cells 20 are described as being cubic, they are not limited to being cubic and can have any polygonal shape, including but not limited to triangular prism, rectangular prism, pentagonal prism, etc. As previously discussed, the shape and dimensions of the frame 100 are set to correspond to those of the cell housing 21. For example, to manufacture a winding for a cell housing having the shape of a pentagonal prism, the frame 100 would have a pentagonal shape when viewed in cross section, and have dimensions corresponding to those of the pentagonal cell housing.

Although the cells 20 are described as being lithium ion cells, the cells 20 are not limited to this type of cell. For example, the cells 20 may include different combinations of electrode materials and electrolytes, including lead-acid, nickel cadmium (NiCd), nickel metal hydride (NiMH), and lithium ion polymer.

Although the illustrated embodiment includes a two dimensional cell array, the battery pack 1 is not limited to having a two dimensional cell array. For example, the battery pack may include cells arranged in a three dimensional array. Moreover, the number of rows and/or columns of cells used in the array may be greater or fewer than illustrated, and is determined by the requirements of the specific application.

Selective illustrative embodiments of the battery pack and battery pack housing are described above in some detail. It should be understood that only structures considered necessary for clarifying these devices have been described herein. Other conventional structures, and those of ancillary and auxiliary components of the battery pack system, are assumed to be known and understood by those skilled in the art. Moreover, while working examples of the battery pack and battery pack housing been described above, the battery pack and/or battery pack housing is not limited to the working examples described above, but various design alterations may be carried out without departing from the devices as set forth in the claims.

What is claimed is:

1. A method of manufacturing an electrode assembly for use in an electrochemical cell, the method comprising
    providing a positive electrode, a negative electrode and a separator disposed between the positive electrode and the negative electrode, the positive electrode, the separator and the negative electrode arranged in a layered configuration to form an electrode stack,
    winding the electrode stack about a winding axis in a spiral configuration in which an outermost layer of the wound electrode stack is wound first, and an innermost layer of the wound electrode stack is wound last.

2. The method of claim 1, wherein each layer of the wound electrode stack is formed having corners, and a radius of the corners of the outermost layer is the same as a radius of a layer wound subsequently to the outermost layer.

3. The method of claim 1, wherein the method includes
    winding the electrode stack into a polygonally-shaped winding having the spiral configuration by forming the outermost layer of the polygonally-shaped winding into a polygonal shape when viewed in a cross-section that is transverse to the winding axis.

4. The method of claim 3, including subsequently arranging additional layers on an inner side of the outermost layer.

5. The method of claim 4, wherein each additional layer has a polygonal shape when viewed in the cross-section that is transverse to the winding axis.

6. The method of claim 5, wherein the method includes
providing a second winding having a spiral configuration, and
electrically connecting the second winding to an innermost end of the polygonally shaped winding.

7. The method of claim 1, wherein the method includes providing a polygonal frame, and
the step of winding the electrode stack includes overlying the electrode stack along an inner surface of the frame.

8. The method of claim 7, wherein overlying the electrode stack includes
continuously arranging the electrode stack within the frame such that a layer of the electrode stack is placed upon the inner surface of the frame one side of the frame at a time and upon each side of the sides of the frame in a serial manner, and subsequent layers of the electrode stack are placed upon an inner surface of the layer.

* * * * *